United States Patent [19]
Lovrich

[11] 3,775,257
[45] Nov. 27, 1973

[54] SOLAR DISTILLATION APPARATUS
[76] Inventor: John Lovrich, Nanuet, N.Y.
[22] Filed: Dec. 27, 1971
[21] Appl. No.: 212,271

[52] U.S. Cl.............. 202/234, 202/196, 202/202, 203/DIG. 1, 159/1 S
[51] Int. Cl.................... B01b, B01d 3/00, F28b
[58] Field of Search.............. 203/DIG. 1, 10, 11, 203/100, DIG. 22; 202/234, 196, 202; 159/1 S, DIG. 1

[56]  References Cited
UNITED STATES PATENTS

| | | | |
|---|---|---|---|
| 798,901 | 9/1905 | Hodges | 202/202 X |
| 2,064,953 | 12/1936 | Serpas | 159/DIG. 1 |
| 2,490,659 | 12/1949 | Snyder | 202/234 X |
| 2,636,129 | 4/1953 | Agnew | 159/1 S X |
| 2,969,637 | 1/1961 | Rowekamp | 203/100 X |
| 3,224,948 | 12/1965 | Akers | 202/180 X |
| 3,330,740 | 7/1967 | Duffy | 202/205 X |
| 3,357,898 | 12/1967 | Novakovich | 202/234 |
| 3,394,054 | 7/1968 | Hoham | 203/11 X |
| 3,420,745 | 1/1969 | Schlueter | 202/234 X |
| 3,483,091 | 12/1969 | Metzger et al. | 203/11 X |

Primary Examiner—Jack Sofer
Attorney—Aaron B. Karas

[57]  ABSTRACT

A solar distillation apparatus for converting sea water into fresh water. A transparent dome condenses solar energy and heats sea water in a container beneath it. The periphery of the dome is provided with a continuous channel for conveying vaporized liquid into a condenser tank. Means are included for collecting rain water. A sea water supply tank is provided with a demand valve for feeding to a main heating chamber. The distilland is filtered and fed to an underground reservoir.

5 Claims, 4 Drawing Figures

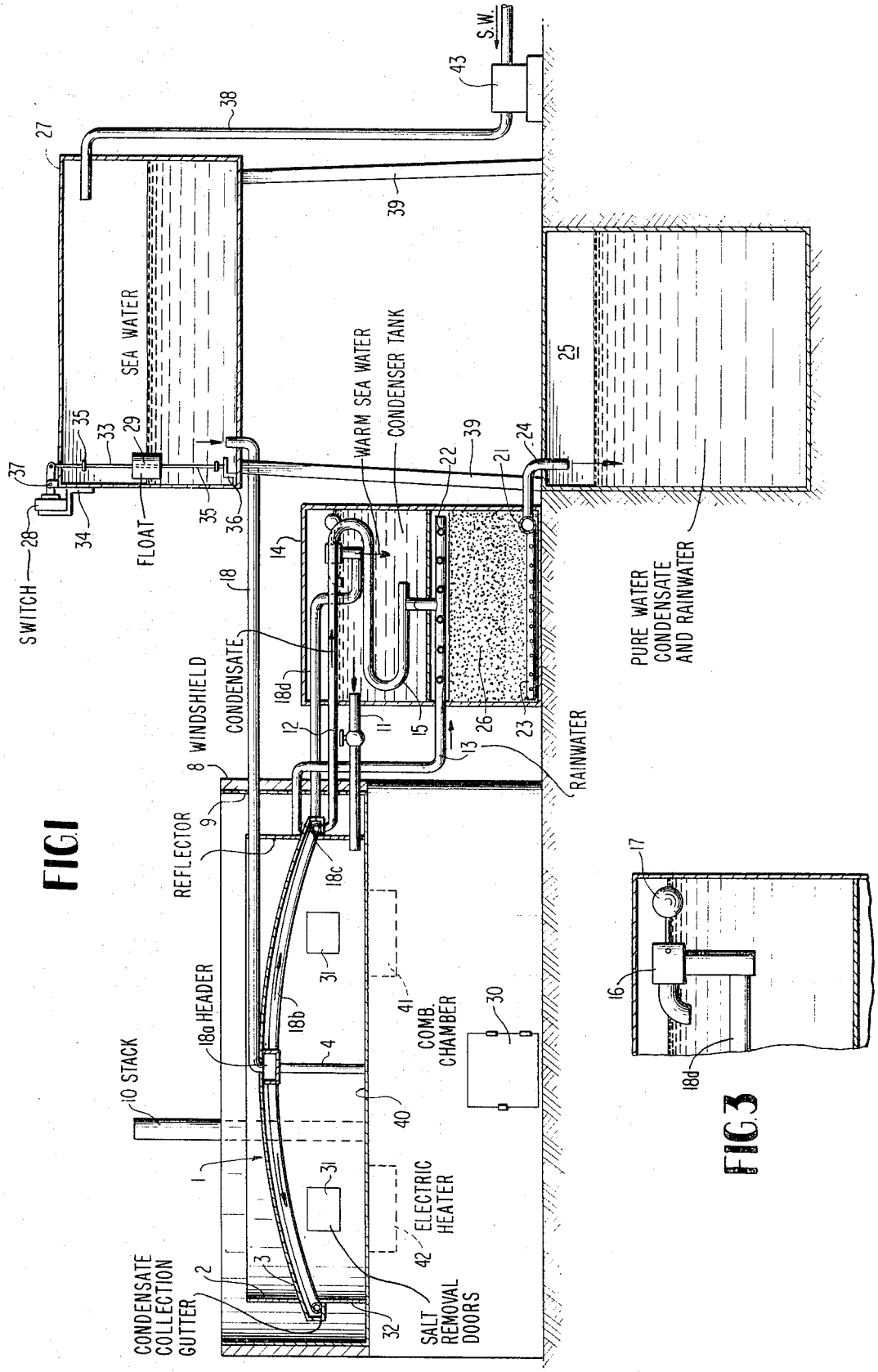

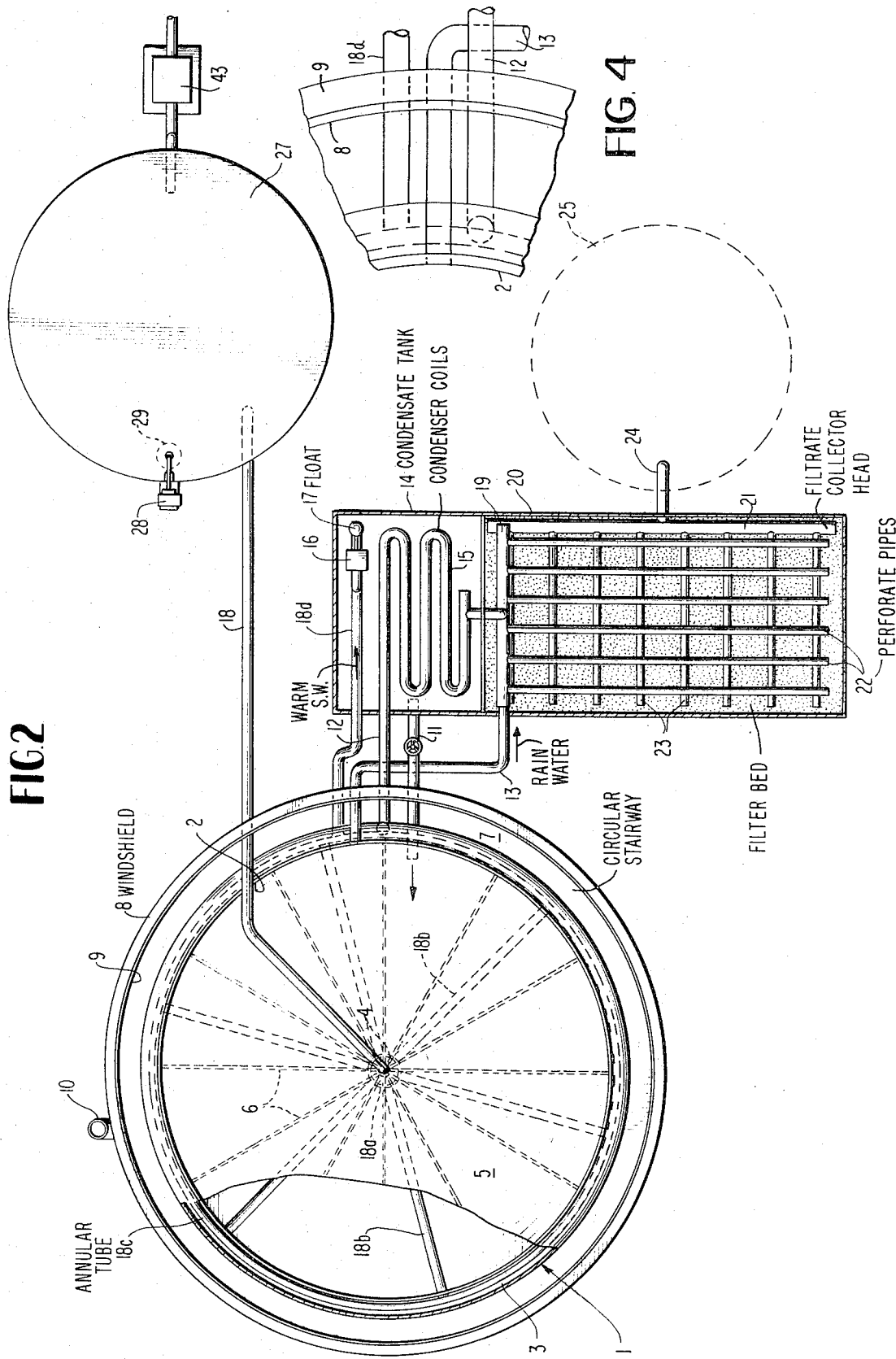

SOLAR DISTILLATION APPARATUS

This invention relates to a solar distillation apparatus which is particularly adapted to convert sea water into fresh water. The invention more particularly relates to a static installation for use on land, as opposed to several such devices which have heretofore been proposed for use actually in the water. In general, the device includes a curved dome formed of sheets of transparent material which defines the top closure of a heating chamber. Sea water which is to be distilled is automatically fed into the chamber to thereby maintain the level of sea water in the chamber very nearly constant.

While the prior art is aware of a variety of devices for converting sea water into fresh water, they have in general suffered many drawbacks. For example, many such devices are extremely expensive to operate because either of their complexity or because of special materials such as permeable membranes which are required. The present invention employs components which are more or less standard items of manufacture and may be accordingly readily obtained from a variety of commercial sources with correspondingly lower expense involved in their procurement.

The invention further exhibits the property of auxiliary heat sources, such as electric heating or wood burning, or the like, which may be employed on cloudy or overcast days.

The construction and advantages of this invention will be apparent from the following description.

IN THE DRAWINGS

FIG. 1 is a vertical cross-section of an apparatus constructed according to this invention.

FIG. 2 is a plan view, partially in section, of the apparatus illustrated at FIG. 1.

FIG. 3 is a detail illustrating a valve construction in the condenser tank illustrated at FIG. 1.

FIG. 4 is an enlarged detail showing the connections of the ducts 12, 13 and 18d to the gutter.

Referring now to the drawings, the numeral 1 denotes the dome of the apparatus and is defined by transparent material, such as plastic or glass and preferably having a lens-like cross-section which increases the effect of solar radiation within the dome. The numeral 2 illustrates a solar energy condensing reflector, preferably formed of highly polished sheet metal, and in the form of a concave cylindrical section. The purpose of the reflector is to reflect onto the top of dome 1 more light from the sun when it is either rising or setting. The numeral 3 denotes a gutter running continuously around the interior periphery of the dome 1 and for the purpose of collecting condensate from the interior of the still. The numeral 4 denotes a supporting column which is centrally disposed of the apparatus and for the purpose of supporting the dome 1. The numeral 5 illustrates a typical segment of the dome 1, the segment being generally triangular. A frame element denoted by the numeral 6 may be employed to support the segments 5 which define the dome 1. The numeral 18a denotes a central header which feeds cool sea water supplied by pipe 18 to condenser tubes 18b and thence into receiving pipe 18c which is located in gutter 3. The condenser tubes 18b provide the primary condensing for the apparatus and also act as a heat exchanger. The distilled vapors contact condenser tubes 18b which are cooled by sea water and the inner surface of dome 1, condense and then run into gutter 3.

Referring to FIG. 2 in particular, the numeral 7 denotes a circular staircase which is generally spiral in configuration and leads from the ground level to the upper portion of the dome. In order to lessen any cooling effect of wind on the dome 1, an outer wall 8 is provided which surrounds the dome and is slightly higher than the top of solar energy condensing reflector 2. This construction precludes direct cooling by convection of the dome on turbulent days. The interior of the circular wall 8 is provided with a preferably metallic solar energy concentrating reflector 9 to further converge and increase the reflectance of solar energy onto the dome structure. In the event auxiliary heating is employed, a smoke stack 10 is provided for leading away products of combustion from combustion chambers conveniently located below the still.

The numeral 11 illustrates a section of a valved water conduit connecting the interior of the still to the interior of the condenser tank 14. The numeral 12 illustrates a pipe leading from the gutter 3 to condenser coils 15. Another pipe 13, illustrated at FIG. 2, defines a rain water collection pipe leading from the space between the solar energy condensing reflector 2 and the top of the dome 1 and which merges with the output of the condenser coils 15.

The numeral 16 illustrates an intake pipe to a valve which is float controlled by a float 17. Connector pipe 18d from receiving pipe 18c feeds the now warmed sea water input to the valve controlled by float 17. The output of this valve is a spigot which empties into the interior of condenser tank 14. Thus, the float 17 controls the quantity of water admitted into the condenser tank 14 and hence supplied through pipe 11 into the interior of the still. The sea water in the condenser tank 14 acts as a coolant for the pipe 15 to thereby cool the condensate and condense any vapor which passes into pipe 15.

The numeral 19 illustrates a header which is fed by the output of pipes 13,15 and which is also supplied by rain water input pipe 13. The numeral 20 denotes a wall of the filter bed whose interior contains a filtrate collector head 21. The numeral 22 denotes any one of a plurality of distillate distributor pipes which may conveniently be formed of plastic and which are apertured along their length. The numeral 23 denotes filtrate collector pipes which may be formed in the same manner as pipes 22 and which run at right angles thereto. The numeral 26 denotes a filter bed that is preferably formed from a mixture of charcoal and sand.

The numeral 27 denotes a sea water supply tank which is elevated to a height above the maximum height of the water within the still chamber. An electrical limit stop switch 28 is supported and attached to by the tank 27 and its electrical operation is controlled by a float 29 adapted to float on the surface of the sea water in the tank 27. The numeral 33 denotes a vertically disposed float rod which passes through the float 29 and confines its motion to vertical displacements. The numeral 34 denotes a supporting bracket for attaching the switch 28 to the tank 27, while the numeral 35 denotes the stop limits on rod 33 for the switch 28. The numeral 36 denotes a supporting bracket for maintaining the rod 33 in the desired vertical position. A pivot is indicated by the numeral 37 and is that point about which a switch actuating element rocks to initiate actuation of the switch through connection with the vertically displaceable rod 33.

The numeral 38 denotes a supply conduit leading into the tank 27 for the purpose of supplying sea water thereto. The numerals 39 indicate supporting members for the tank 27. A pump 43, preferably at the ground level, is actuated by the operation of switch 28 to thereby supply fresh volumes of sea water into the tank 27 as the content thereof is emptied into the still. If topographic conditions permit, the solar apparatus of the present invention may be constructed below sea-level so that sea water may be supplied by gravity feed. In such case, supply tank 27, pump 43 and all associated auxiliary equipment may be eliminated thereby reducing the cost of installation and operation.

As indicated by the dotted lines at FIG. 1, the still may include a combustion chamber indicated generally by the numeral 41 for the purpose of burning wood, coal, or the like, in the event of rainy or cloudy days. The products of combustion from this chamber are fed to the smoke stack 10. Similarly, the numeral 42 denotes a chamber for the reception of an electrical heating element in the event that electrical heating is desired on rainy or cloudy days.

The numeral 30 denotes a door positioned in the peripheral plurality of the apparatus for the purpose of providing access for installation work, repair work, cleaning of the grates for chamber 41, etc. The numerals 31 denote corresponding doors leading directly to the interior of the dome chamber. The numeral 32 denotes a section similar to wall 30, formed of sheet metal, which may define the sides of the dome structure. It will be observed that the doors 31 provide ready access for the removal of the salt residue. This residue may be employed for other purposes, such as for salting roads in northern latitudes for the purpose of inhibiting ice formation.

In the preferred embodiments of the invention as large a pluraltiy of tubes 18b as possible is used to provide maximum vapor condensing capacity and a much greater rate of condensation than would otherwise be possible.

It is believed that the general mode of operation will be apparent from the above description. In general, with a given supply of sea water in tank 27, the water is fed into header 18a through pipe 18. Header 18a distributes the water through tubes 18b which provide substantial condensing capacity and function as a heat exchanger. The sea water in passing through tubes 18b is warmed as the distilled vapors are cooled and condensed. The warmed water then passes through receiving pipe 18c. Water from receiving pipe 18c passes through connector pipe 18d and is then fed into the condenser tank 14 through the valve which is operated by float 17. A portion of this water is fed through pipe 11 into the interior of the still. Solar energy heats the interior of the still, causing vapors to collect on tubes 18b and on the underside of the dome and become lodged in gutter 3. This vapor and partial condensate flows by gravity through pipe 12 into the cooling coils 15. The sea water in tank 14 assists in cooling the condensate and condensing vapors to effect complete condensation. The output from the pipes 15 is fed into the header 19, thence through pipes 22, thence through the filter bed 26 and out from pipes 23 to output header 21. From here, it passes through conduit 24 (which may be provided with a liquid trap if desired) and thence into reservoir tank 25.

I claim:

1. A solar distillation and desalinization apparatus comprising:
   a. a heating chamber having a transparent top convex dome, said dome adapted to receive solar radiation,
   b. the interior of said dome being provided along its internal periphery with a continuous gutter,
   c. said dome being provided with a plurality of radial, arcuate, sea-water conveying condenser tubes connected between a central feed header at the top of said dome and an annular tube lying said continuous gutter along the inner surface of said dome,
   d. said dome being provided on its external periphery with a vertically disposed concave part cylindrical solar energy condensing reflector,
   e. a sea water supply tank positioned at a level above said solar heating chamber,
   f. means for controlling the output from said sea water supply tank including a motor operating electrical switch supported by said supply tank, a vertically movable float adapted to be actuated by sea water within said tank and whose vertical position controls said electric switch to activate a pump motor at low water level and inactivate the motor at high water level, a pump connected to a source of sea water and whose output is coupled to said supply water tank for supplying sea water thereto, the operation of said pump being controlled by the actuation of said electrical switch as indicated,
   g. a condenser tank having condensate conveying coils in fluid receiving communication with said peripheral gutter,
   h. a liquid conveying conduit connecting said condenser tank and the interior of said heating chamber for feeding warmed sea water to said chamber,
   h'. a sea water conveying conduit connecting said annular tube and the condenser tank
   i. float controlled valve means connected to the terminus of said last mentioned tube and positioned within said condenser tank for controlling the level of liquid in said condenser tank,
   j. a filter bed, the output of said condenser coils feeding the top of said filter bed,
   k. conduit means for receiving the output from said filter bed and leading to a fresh water reservoir tank.

2. The apparatus of claim 1 including
   a. a peripheral wall spaced from the edges of said heating chamber and extending to substantially the same vertical height of said heating chamber to thereby shield said heating chamber from the effects of cooling by wind convection currents,
   b. said peripheral wall provided with solar energy condensing reflector means on its interior surface to thereby assist in directing solar radiation to said solar heating chamber.

3. The apparatus of claim 2 including means contiguous to said dome for collecting rain water and means for leading said rain water to the said filter.

4. The apparatus of claim 1 wherein said fresh water reservoir tank is positioned below the level of the ground.

5. The apparatus of claim 4 wherein said heating chamber is elevated from the ground and rests on a static structure, the lower portion of said heating chamber being contiguous to a combustion chamber for burning a fuel and also contiguous to an electrical heating element, said static structure being provided with an access door permitting inspection of said combustion chamber and electrical heating element, said heating chamber being provided with access doors for the purpose of obtaining access to its interior.

* * * * *